United States Patent
Daniel (10) Patent No.: US 8,653,757 B2
(45) Date of Patent: Feb. 18, 2014

(54) DC-DC CONVERTER

(75) Inventor: Bobby Jacob Daniel, Eindhoven (NL)

(73) Assignee: NXP B.V., Eindhoven (NL)

( * ) Notice: Subject to any disclaimer, the term of this patent is extended or adjusted under 35 U.S.C. 154(b) by 476 days.

(21) Appl. No.: 12/996,092

(22) PCT Filed: May 29, 2009

(86) PCT No.: PCT/IB2009/052273
§ 371 (c)(1),
(2), (4) Date: Dec. 3, 2010

(87) PCT Pub. No.: WO2009/147601
PCT Pub. Date: Dec. 10, 2009

(65) Prior Publication Data
US 2011/0080118 A1    Apr. 7, 2011

(30) Foreign Application Priority Data
Jun. 4, 2008    (EP) ..................................... 08104251

(51) Int. Cl.
*G05F 1/00*    (2006.01)
(52) U.S. Cl.
USPC ............................. 315/309; 315/112; 315/307
(58) Field of Classification Search
USPC ............. 315/32, 72, 112, 113, 116, 117, 193, 315/210, 224, 291, 297, 299, 301, 307, 309, 315/311, 312, 313, 362
See application file for complete search history.

(56) References Cited

U.S. PATENT DOCUMENTS

| 6,150,771 A | 11/2000 | Perry |
| 7,276,861 B1 * | 10/2007 | Shteynberg et al. .......... 315/291 |
| 2005/0140315 A1 | 6/2005 | Baldwin et al. |
| 2007/0200512 A1 | 8/2007 | Gotou et al. |

FOREIGN PATENT DOCUMENTS

| CA | 2433711 | 12/2003 |
| JP | 08-072295 A | 3/1996 |
| WO | 2007/071033 A | 6/2007 |
| WO | 2007/116332 A2 | 10/2007 |

OTHER PUBLICATIONS

International Search Report and Written Opinion for Application PCT/IB2009/052273 (Aug. 4, 2009).

* cited by examiner

*Primary Examiner* — Douglas W Owens
*Assistant Examiner* — Jianzi Chen (57) ABSTRACT

A DC-DC converter for driving one or more LED (38), which converter comprises an integrated circuit (12) having a switch mode power circuit (24) and a 5 temperature sensing circuit (40) for providing an output indicating a temperature of said integrated circuit (12), the arrangement being such that, in use, said integrated circuit consumes power, some of which power is dissipated in said integrated circuit as heat causing a rise in said internal temperature, and wherein a change in said output from said temperature sensing circuit (40) is used by said integrated circuit to 10 adjust said consumed power whereby said internal temperature may be controlled.

15 Claims, 8 Drawing Sheets

DC-DC CONVERTER

FIELD OF THE INVENTION

The present invention relates to a DC-DC converter for driving one or more LED, to an application specific integrated circuit (ASIC) and an application specific standard product (ASSP) each comprising such a converter.

BACKGROUND TO THE INVENTION

A single LED die intended for solid state illumination is generally made from one of two semiconductor materials: InAlGaP (red, orange and amber) and InGaN (green and blue). Similar to standard PN junction diodes, LEDs conduct current when they are forward biased. Two design aspects of LEDs are (1) that they are driven by current, and (2) the forward voltage ($V_F$) is low and DC; typical $V_F$ ranges from 2V to 3V for InAlGaP LEDs and from 3V to 4V for InGaN LEDs. The luminous flux of an LED is proportional to the forward current.

Since LEDs are current driven devices, the preferred driving method is with a constant current source; this reduces changes in current due to variations in forward voltage across the semiconductor junction of the LED. In order to regulate current, the input power supply regulates the voltage across a current-sense resistor in series with the LED(s). Integrated circuits (ICs) that perform the driving function are known as LED drivers. The driver IC comprises a constant-current source (e.g. a switching regulator) and circuitry to regulate the DC voltage across the current-sense resistor. The switching regulator, also called the half-bridge stage, is controlled by circuitry (comprising analogue blocks such as a comparator, reference level generator etc., and also digital logic) which monitors the voltage on the current sense resistor. This system as a whole works as a constant current source. The half-bridge may or may not be fully or partially in the IC, but the control circuitry is embedded. The current-sense resistor is not part of the LED driver and an application designer chooses the value of the current sense resistor to be suitable for the particular application, LED(s) and driver.

The switching regulator in the LED driver has one or more power transistor which in use often has the greatest heat losses on the IC, although heat is lost from other circuit components. In order to protect the power transistor(s) and other circuit components on the IC from damage at high temperatures, the LED driver IC comprises an internal temperature sensing circuit which, ideally, is close to the power transistor(s) but not necessarily so. In use, the temperature sensing circuit provides an output signal indicative of the internal temperature in the IC which is monitored by the control logic circuit. If the internal temperature of the IC reaches a predetermined threshold (e.g. 130° C.), the control logic shuts down the switching regulator to inhibit further rises in internal temperature that might otherwise damage the power transistor(s) and other IC components. When the temperature falls below the threshold temperature, the control logic activates the switching regulator again. If the LED driver is used in environments with high ambient temperature, an on-off cycle of the LED(s) can result, which is highly undesirable from a visual perspective.

To compound this problem, LED drivers are intended for use in a diverse range of environments. For example, the LED driver can be used in freezer lighting, and in exterior and interior architectural applications amongst others. Accordingly the ambient temperature around the IC during operation may vary considerably, for example in external applications between ±20° C. to 30° C. or more depending on the location, season and time of day. The variation in ambient temperature affects the internal temperature of the IC. When in operation, heat is dissipated by the LED driver and LED(s) which increases the internal temperature of the IC above ambient, and may often approach the maximum junction temperature for the power transistors, and/or a temperature that would damage other circuit components.

The heat losses in the LED driver IC may be divided in two categories: DC conduction losses and transient losses. The conduction losses are directly proportional to the RMS value of the output current and also proportional to the duty cycle (if only one internal power transistor is used). Transient losses comprise capacitive losses and the switching loss (due to non-zero voltage switching), both of which are proportional to switching frequency. How these losses affect the internal temperature of the IC (i.e. inside the package) is non-trivial, but does depend to some extent on the IC mounting substrate and any heat sinks amongst other things.

Therefore the problem facing the LED driver designer is to match the LED driver and its external circuit components to the particular application, having regard to the expected ambient temperature variation at point of use. To that end, the designer tries to limit heat dissipation in the IC as far as possible. One way that the designer can limit heat dissipation is to adjust the components used in the LED driver to control the output power by adjusting the switching frequency. In particular, an inductor is required for the switch-mode power supply to transfer input voltage to output voltage without wasting power. By changing the value of this inductor, the rate of change of current across the inductor changes, and the application designer can increase or decrease the switching frequency.

For example, a particular LED driver might be expected to operate at ambient temperature usually of 45° C., but occasionally that temperature can rise up to 75° C. The application designer has to ensure the IC temperature never goes above 125° C. if temperature shut down is to be avoided. Therefore a 50° C. rise in temp in IC is permissible, assuming highest ambient temperature. If the thermal resistance of package is 50K/W the LED driver must be designed so that switching frequency and average current heat losses do not exceed 1 W. This can be achieved by using a larger inductor, but this also limits output light from the LED(S). Furthermore, since the ambient temperature is mostly 45° C., the LED driver operates at significantly less than maximum performance. An alternative would be to design for a 1.6 W heat dissipation, use smaller inductor, permitting the same average current and thereby output light, but at a lower switching frequency. However, this is with the risk that at higher ambient temperatures the temperature cut-off problem may occur.

In many cases the designer chooses to design for the worst case ambient temperature (i.e. the highest expected value) to reduce the chance that the driver and LED(s) will suffer the aforementioned on-off cycling problem. Therefore a conservative inductance value is used that maintains a lower average current than could be used for most of the time, affecting the performance of the LED(s). Furthermore extra heat sinks may be added as a precaution, increasing cost.

If there is any mismatch between the expected ambient temperature variation and reality the LED driver and LED may nonetheless still suffer from the on-off cycling problem. From the user's perspective this visual effect is highly undesirable.

US 2005/014315 discloses a current control device for driving LEDs that employs switch mode hysteretic control to de-rate the current with increasing temperature. The temperature external to the LED driver IC is indicated with a resistor in order to switch on and off the de-rating. Another external resistor sets the shutdown temperature for the LED driver. This arrangement monitors the temperature of the LEDs, but will not prevent the LEDs being switched on and off by an LED driver in over temperature conditions inside the IC.

SUMMARY OF THE INVENTION

The present invention is based on the insight by the applicant that a problem usually tackled by DC-DC converter designers (i.e. choosing circuit components to suit a specific application) can be addressed within the integrated circuit itself, thus simplifying the task for the designer. In particular an internal temperature sensing circuit present on an LED driver IC, for example, can be used to anticipate onset of high internal temperature (e.g. the maximum acceptable internal temperature of the integrated circuit) and when that happens, the driver can be configured to de-rate the power dissipated inside the IC and therefore reduce the on-chip heat losses in an attempt to maintain the IC at a safe operating temperature below the shutdown temperature. Furthermore, it has been realised that the de-rating can be achieved substantially without affecting the output from the IC; if the IC is part of an LED driver the visual appearance of the LED(s) is substantially unaffected. In this way an DC-DC converter designer can design for a typical ambient temperature scenario, rather than for the maximum ambient temperature. This enables smaller inductors and heat sinks to be used, reducing the cost of the system. When the worst-case ambient temperature conditions do occur (and when they are approached), the LED driver will automatically de-rate the power dissipated to reduce the heat losses inside the IC.

In particular, the human eye can detect lighting flicker of a frequency less than about 50 Hz. Since many DC-DC converters have ripple current in the hundred kHz to MHz range, a change in switching frequency will not be perceptible. However, a change in switching frequency can result in a perceived change in brightness of the LED(s). It has been realised that the IC power de-rating can still be achieved substantially without affecting perceived brightness of the LED(s).

According to the present invention there is provided a DC-DC converter for driving one or more LED, which converter comprises an integrated circuit having a switch mode power circuit and a temperature sensing circuit for providing an output indicating a temperature of said integrated circuit, the arrangement being such that, in use, said integrated circuit consumes power, some of which power is dissipated in said integrated circuit as heat causing a rise in said internal temperature, and wherein a change in said output from said temperature sensing circuit is used by said integrated circuit to adjust said consumed power whereby said internal temperature may be controlled. In some embodiments said integrated circuit is configured to de-rate said consumed power when said output indicates an increase in said internal temperature, whereby said power dissipated in said integrated circuit is reduced. By de-rating the power consumed by the IC as a function of internal temperature, the heat dissipated in the IC can be reduced as a shutdown temperature is approached. In some embodiments the converter is configured to operate in the continuous current mode and the DC-DC converter may be of the buck mode type. In other embodiments, the DC-DC converter is configured to operate in the discontinuous current mode and the DC-DC converter may be of the flyback or boost type. The inventive concept is applicable to a any DC-DC converter circuit topology including, but not limited to, CUK or modified CUK (also know as inverting charge-pump), SEPIC, half-forward, forward, push-pull, half-bridge, full-bridge, resonant and charge pump.

Furthermore the inventive concept (to de-rate power dissipation as the IC temperature increases but with little or no effect on perceivable output) can be applied to all manner of integrated circuits. For example a phone charger IC might become hot after a period of use; in accordance with the invention the IC can respond by adjusting some parameter of the IC that affects IC power dissipation in order to reduce on-chip heat dissipation which has least effect on the output to the phone.

Preferably, said switch-mode power circuit is for supplying a substantially constant average current to said one or more LED, wherein said converter comprises a circuit for controlling said switch-mode power circuit so as to adjust said consumed power whilst leaving said average current substantially unaffected, whereby the visual appearance of said one or more LED appears unaffected. In some embodiments the switch-mode power circuit is integrated in the LED driver IC. When an SMPC is integrated into the IC, the die temperature during use becomes the limiting factor on the die size. By reducing heat losses as the shutdown temperature is approached the die size of the integrated circuit can be reduced.

Preferably, said integrated circuit is configured to compare said output from said internal temperature sensing circuit with a first temperature level and a second temperature level higher than said first, and if said internal temperature is higher than said first temperature level and lower than said second, to adjust said consumed power in proportion to the difference between said output and said first temperature level. One advantage of this is that as the temperature increases over the first (or early-warning) temperature level, the heat dissipation on the IC is increasingly limited as the second (or shutdown) temperature is approached. For example, if the ripple voltage in the switch-mode power circuit is 10% of the average output voltage, once the internal temperature of the IC reaches the early-warning threshold, the ripple voltage has been increased up to 50% just before the shutdown temperature.

Advantageously, said integrated circuit is configured to effect a substantially linear increase in said ripple voltage of said switch-mode power circuit as said internal temperature increases from said first to said second temperature level. It will be appreciated that the ripple voltage may be increased in other ways, for example non-linearly or step-wise according to preference.

Advantageously, the DC-DC converter further comprises a hysteretic levels controller circuit for setting at least one of a peak voltage level and a valley voltage level, which peak and valley levels determine said ripple voltage of said switch-mode power circuit.

In some embodiments, said internal temperature sensing circuit is adapted to supply said output to said hysteretic levels controller circuit that is configured to increase the magnitude of a ripple voltage of said switch-mode power circuit whereby the switching frequency is reduced.

Preferably, said internal temperature sensing circuit is adapted to supply said output signal to said hysteretic levels controller circuit that is configured to raise said peak voltage level and lower said valley voltage level in response to increasing internal temperature, thereby reducing said switching frequency to effect de-rating of said consumed power.

Advantageously, said hysteretic levels controller circuit is configured to raise said peak and lower said valley voltage levels by the same amount, whereby said average current is unaffected by de-rating of said consumed power. One particular advantage of this is that the visual perception of the light from the LEDs is substantially unaffected by the power derating.

In other embodiments of the present invention, said converter further comprises a control logic circuit for adjusting the average current output by said converter by controlling an on period ($T_{on}$) and an off period ($T_{off}$) of each commutation cycle. This type of control may be known as '$T_{on}$ control' and '$T_{off}$ control' respectively.

In some embodiments, said control logic circuit is configured to increase said off period to de-rate said consumed power in response to an increase in said internal temperature as indicated by said output and optionally said control logic circuit is configured to control said on period by adjusting a peak current level in said switch-mode power circuit in order to compensate for a decrease in said average current output by said converter.

In other embodiments, said control logic circuit is configured to increase said on period ($T_{on}$) to de-rate said consumed power in response to an increase in said internal temperature as indicated by said output and optionally said control logic circuit is configured to control said off period ($T_{off}$) by adjusting a valley current level in said switch-mode power circuit in order to compensate for an increase in said average current output by said converter Preferably, said control circuit is configured to reduce the switching frequency of said switch-mode power circuit in response to an increase of said internal temperature as indicated by said output.

Advantageously, said integrated circuit is configured to increase said peak current level in said switch-mode power circuit in order to compensate for a decrease in said average current output by said converter.

According to another aspect of the present invention there is provided an ASIC or ASSP comprising a DC-DC converter as set out above.

BRIEF DESCRIPTION OF THE FIGURES

For a better understanding of the present invention reference will now be made, by way of example, to the accompanying drawings in which.

DETAILED DESCRIPTION OF THE PREFERRED EMBODIMENTS

Figure 1:
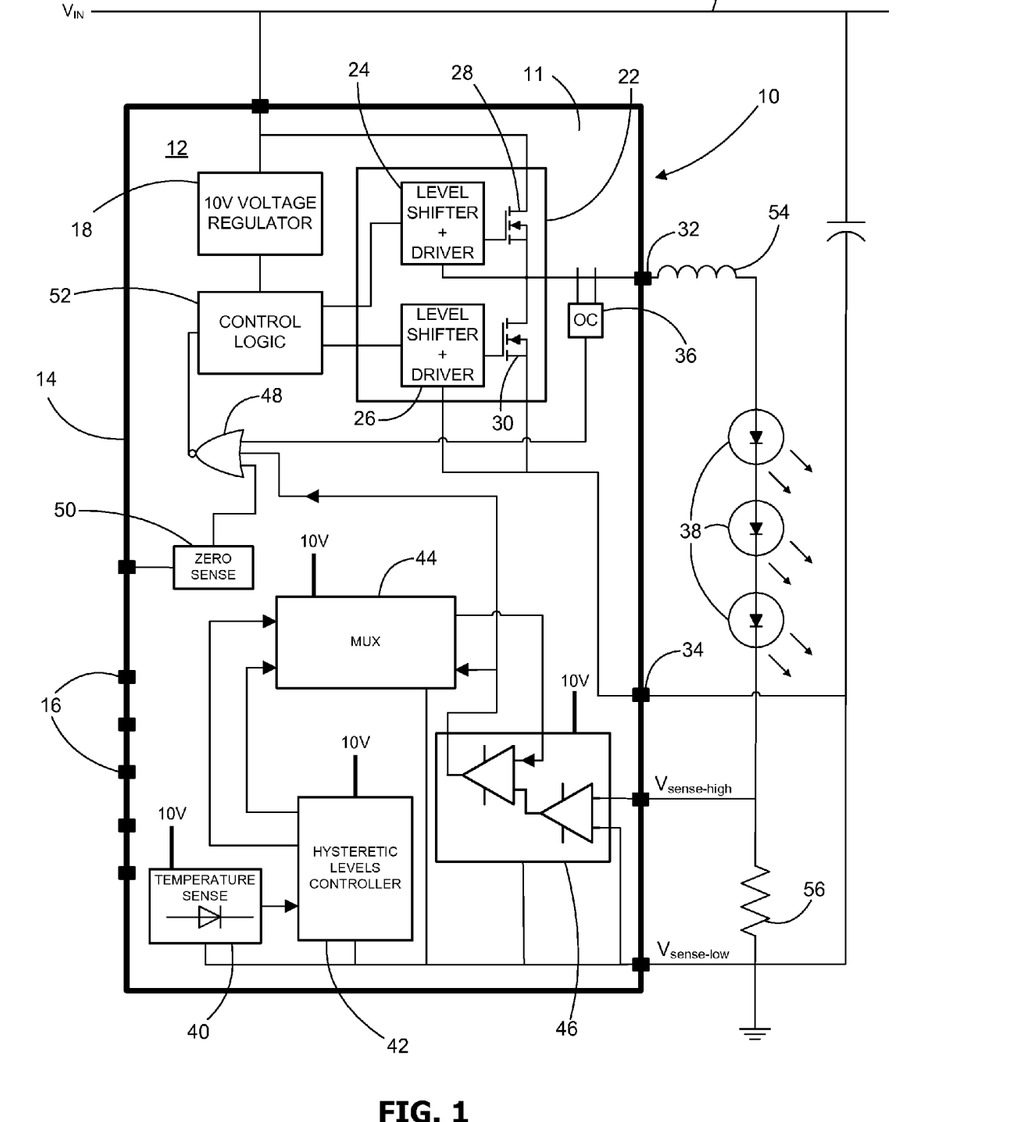
FIG. 1 is a schematic block diagram of a first embodiment of an integrated circuit (IC) according to the present invention in use.

Referring to FIG. 1 a buck mode LED driver 10 comprises an integrated circuit (IC) 11 having a die 12 that is housed in a package 14, such as a DIP. The LED driver is designed to operate in the continuous current mode and to drive a substantially constant output current. The IC 10 may be in the form of an ASIC or ASSP. The package 14 comprises a number of pins 16 (not all shown), some of which are used for connection to external circuit components and others of which are used for heat dissipation.

The IC 11 comprises various circuit component blocks as follows. A voltage regulator 18 may receive power from an external power source ($V_{in}$), such as a 12V DC power supply 20. In use, the voltage regulator provides regulated DC voltage to a switch mode power circuit 22 (for operating in the buck mode) and to other circuit components. The voltage regulator 18 is needed especially when $V_{in}$ is of a higher order than the operating voltage of the control circuitry. One or more regulators may be needed depending on the voltages required by digital, analogue and switch mode power circuits.

The power circuit 22 comprises a 'high side' level shifter and driver 24 and a 'low side' level shifter and driver 26 for driving respective power transistors (e.g. MOSFETs) 28 and 30. The power circuit 22 has two outputs: one connected to a power pin 32 of the package 14 and the other connected to a ground pin 34. The power circuit 22 is controlled by control logic circuitry which uses an input from the analogue part of the circuit to monitor whether the current is rising or falling and the settings (peak/valley/$T_{on}$/$T_{off}$) to determine when to turn on or off the power transistors 28 and 30. An over current (OC) circuit 36 protects external LEDs 38 from high current conditions in the event of a fault.

The IC 11 comprises an internal temperature sensing circuit 40 for protecting the power transistors 28 and 30 and other circuit components against overheating (caused by internal and/or external conditions). For example, the internal temperature sensing circuit 40 may comprise a diode through which a current of a particular magnitude is passed. The voltage drop across the diode required to maintain the current can be monitored to provide an output indication of the temperature of the IC 11. The output indication is supplied to a hysteretic levels control circuit 42, whose function will be described in greater detail below. The hysteretic levels control circuit 42 provides two outputs to a multiplexer (MUX) 44. The MUX 44 also receives and input from a differential amplifier and comparator circuit 46.

A 3-input NOR gate 48 has inputs from the comparator circuit 46, the over current circuit 36 and from a zero sense circuit 50. The function of the zero sense circuit 50 is to sense if a dimming control has been set to zero and, if so, to ensure that power is not applied to the LEDs 38. A control logic circuit 52 receives the output from the 3-input NOR gate 48 and controls the power circuit 22 as described in greater detail below. The primary function of the control logic circuit 52 is to determine whether or not to turn on or off the power transistors 28 and 30 according to logic levels it receives from other circuit components. In particular, the control logic circuit 52 combines the input from the NOR gate 48 with other logic signals from other circuit components (not shown) such reset, UVLO and LED over temperature. The output is passed through a blanking circuit (not shown) to prevent responses to spikes from switching, and finally a non-overlap circuit (not shown) ensures that the power transistor 28 has been fully turned off before the other switch 30 is turned on.

Figure 2:
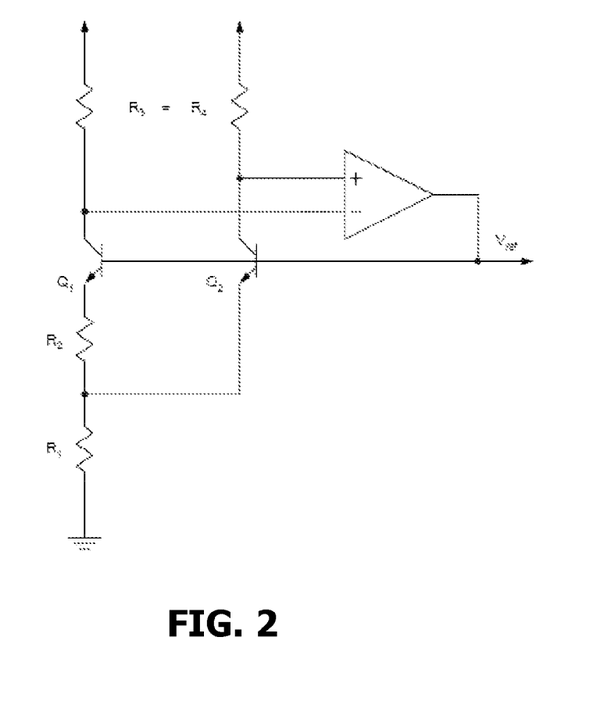
FIG. 2 is a block diagram of an IC temperature sensing part of the integrated circuit of FIG. 1.

Referring to FIG. 2 the internal temperature sensing circuit 40 comprises a bandgap voltage reference circuit. The output voltage $V_{ref}$ is constant with temperature because of the way temperature dependences are designed to cancel each other out. In particular:

$$V_{ref} = V_{base-emitter\_Q2} + V_{R1}$$

where $V_{base\text{-}emitter\_Q2}$ is the diode voltage and has a negative temperature coefficient. The voltage $V_{R1}$ is proportional to the voltage difference between the $V_{base\text{-}emitter\_Q1}$ and $V_{base\text{-}emitter\_Q2}$, which has positive temperature dependence. The way the bandgap circuit is dimensioned is such that these two voltages cancel each other out almost exactly, resulting in constant $V_{ref}$. Thus this circuit has a temperature independent voltage (Vref), and temperature dependant voltages ($V_{base\text{-}emitter\_Q1}$ and $V_{base\text{-}emitter\_Q2}$ with negative coefficient, and $V_{R1}$ or $V_{R2}$, with PTAT behaviour). The latter can be used as the voltage that indicates temperature. $V_{R1}$ and $V_{R2}$ will be compared to constant voltages generated from $V_{ref}$ by resistive division to indicate the warning and shutdown thresholds.

Figure 3:
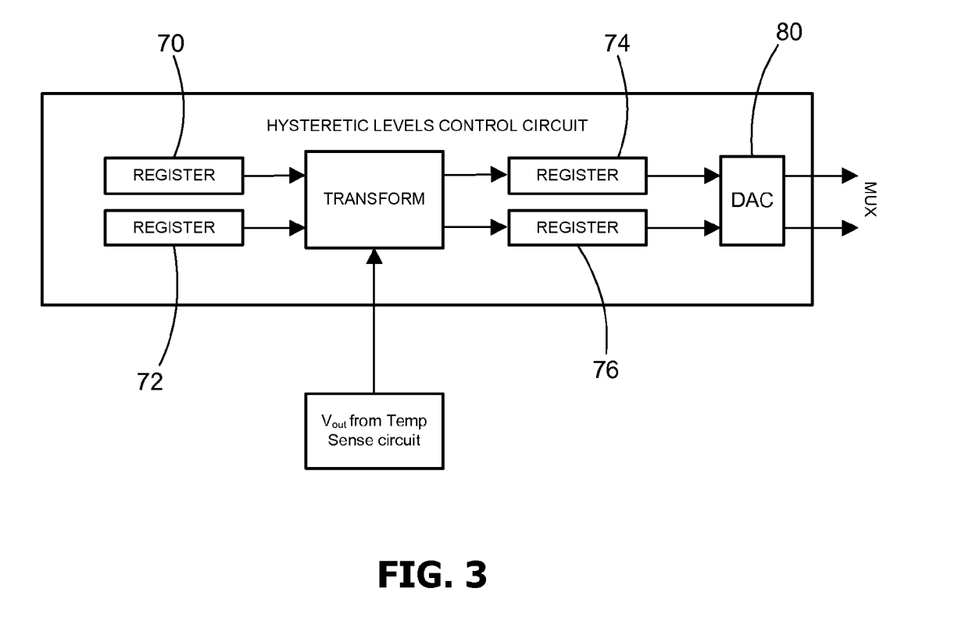
FIG. 3 is a block diagram of a hysteretic levels controller circuit part of the integrated circuit of FIG. 1.

Referring to FIG. 3 hysteretic levels controller circuit 42 comprises a first set of registers comprising registers 70 and 72 which store digital values of the default peak and valley levels for output voltage respectively. The contents of the registers 70, 72 are copied to a second set of registers comprising registers 74 and 76 via a transform circuit 78. In use, the digital values in the registers 74, 76 are converted into analogue using a DAC 80 and the analogue levels are output to the MUX 44. The transform circuit 78 is used to transform the digital values from the first set of registers and store the result in the second set of registers. The transform circuit 78 comprises an input for receiving the temperature dependent voltage ($V_{out}$ i.e. $V_{R1}$ or $V_{R2}$) from the internal temperature sensing circuit 40. The transform circuit 78 compares $V_{out}$ against two thresholds: $V_{early}$ and $V_{shut}$. This could be done using comparators for example. If $V_{out}$ is higher than $V_{early}$, and lower than $V_{shut}$, then the transform circuit 78 determines an offset voltage, $V_{offset}=A*(V_{out}-V_{early})$, where 'A' is the multiplication factor determined by the de-rating curve that the application designer wishes to use. The value of 'A' depends on how much frequency reduction is desired and how fast that reduction is with increasing temperature. So if the original output ripple voltage is 10% of the average output voltage, and up to 30% maximum ripple is acceptable to the designer, then the offset voltage should range from 0V at $V_{early}$ to twice the original output ripple voltage near $V_{shut}$. The computation of $V_{offset}$ can of course be done with digital logic or with analogue (e.g. with an op-amp or differential amplifier).

Then $V_{offset}$ is added to the contents of the register 70 storing the peak output voltage level and subtracted from contents of the register 72 storing the valley voltage level, before writing the resulting values to each register 74, 76. Finally, the contents of registers 74, 76 are subjected to digital to analogue conversion by the DAC 80. Alternatively, $V_{offset}$ may be added to or subtracted from peak and valley levels directly on the analogue levels after the digital to analogue conversion. The resulting analogue voltages are available to the MUX 44

In use the LED driver 10 is connected to external circuit components chosen for a specific design application. In this embodiment an inductor 54 is connected to the power pin 32 in series with three LEDs 38.

The designer may control the power dissipated inside the LED driver IC by selection of the inductance. Since the inductance changes the rate of change of current in the inductor 54, a greater inductance increases the time between switching on and off and vice versa. This results in the same average current through the LEDs, but lower frequency with the same ripple. The average current through the LEDs remains the same, but less power is dissipated in the IC. Therefore the value of the inductor 54 is chosen by the designer to suit the particular expected ambient temperature where the LED driver 10 will be used, perhaps taking into account thermal models of the mounting and housing structures for the LEDs and driver. For example, it could be expected that in an application such as interior building lighting where the LED driver is in a closed casing and mounted in a ceiling void, the ambient temperature around the LEDs would be 85° C.±20-30° C. depending on the season and time of day. Traditionally, the designer has to balance the increased cost of larger inductors against the risk of shutdown at the expected high end of the ambient temperature range. This design methodology results in sub-optimal use of the LEDs 38 and the LED driver 10 since the average current would be set low, and perhaps extra heat sinks would be added increasing cost.

A current sensing resistor 56 of known resistance is connected in series between the LEDs 38 and ground. Two pins of the LED driver 10 are connected to the resistor, one at either end. In use, the voltage at either end of the resistor 56 is taken by the pins and input into the differential amplifier and comparator circuit 46. The voltage dropped across the resistor 56 is indicative of the current passing through it, and therefore of the current through the LEDs 38. Each pin senses a respective voltage, $V_{sense\text{-}high}$ and $V_{sense\text{-}low}$, at either side of the resistor 56. The difference between these two voltages is amplified and compared against an output from the MUX 44. In use, the MUX 44 and differential amplifier and comparator circuit 46 set the amount of current ripple across the LEDs 38. The MUX 44 selects either a peak voltage level or a valley voltage level that is input into the comparator for comparison against the voltage drop across the resistor 56. The high or low output from the comparator is sent both to the MUX 44 and to the 3-input NOR gate 48. Thus, assuming the MUX is outputting the peak voltage level, the voltage drop across the resistor 56 is allowed to increase while the output voltage from the comparator is high. When the voltage drop exceeds the peak voltage level, the output voltage of the comparator switches low causing the MUX 44 to switch to the valley voltage output.

At the same time the input from the comparator into the 3-input NOR gate 48 also switches low. The output from the 3-input NOR gate 48 switches high and the control logic circuit 52 switches the low side level shifter and driver 26 on switching off the power supply to the LEDs 38. Once the voltage drop across the resistor 56 goes below the valley voltage output from the MUX 44, the comparator switches high, causing the MUX 44 to switch output to the peak voltage output. The high input from the comparator to the 3-input NOR gate 48 causes the control logic to switch off the low side lever shifter and driver 26 and switch on the high side level shifter and driver 24, applying power to the LEDs 38.

In this way, the average current through the LEDs 38 is set at a particular level.

As described above the internal temperature sensing circuit 40 provides an output signal representing the temperature of the IC in the LED driver 10. This signal is input to the hysteretic levels controller 42 and, as described above, is used to adjust the hysteretic levels (peak voltage level and valley voltage level) used by the MUX 44. In particular, the hysteretic levels controller 42 stores digital voltage values representing two temperature values (which may be represented by voltage levels for example): a first temperature level $T_{early}$ (e.g. 100° C.) and a second temperature level $T_{shut}$ (e.g. 125° C.) at which shutdown of the IC occurs. Between the two temperature values, the magnitude of the voltage ripple is adjusted up or down linearly by the hysteretic levels controller circuit 42 as a function of the internal temperature. In particular, as the ambient temperature (as indicated by the internal temperature sensing circuit 40) increases above $T_{early}$ the default ripple is gradually increased up to the peak current limit imposed by the LEDs 38 and inductor 54. For example, if the default ripple voltage is 10% of the average voltage level, the ripple voltage may be increased to 50% of the average voltage level as temperature increases above $T_{early}$. The effect of this is that, as ripple voltage increases, the frequency of operation and thereby the power dissipated in the IC is reduced.

To that end, the hysteretic levels controller 42 responds to the temperature signal input from the internal temperature sensing circuit 40 by adjusting the hysteretic levels used by the MUX 44. If the temperature increases above $T_{early}$, the peak hysteretic level is increased, and the valley hysteretic level is decreased by the same amount. For example, if the desired average voltage drop across the resistor 56 is 0.5V and the default hysteretic levels are 0.55V and 0.45V for peak and valley respectively (i.e. a default ripple of 10%), an increase in temperature to near $T_{shut}$ would result in the peak and valley levels being adjusted to 0.75V and 0.25V respectively. A particular advantage of increasing the peak and decreasing the valley values by the same amount is that the average current through the LEDs is maintained the same, but the power dissipated inside the LED driver IC is lower without observable effects.

If the temperature indicated by the internal temperature sensing circuit 40 decreases within the range between $T_{early}$ and $T_{shut}$, the ripple voltage can be reduced in the same way, thereby increasing the power dissipated in the IC.

As an example, a particular application is expected to have a typical ambient temperature of 45° C. and the maximum IC internal temperature of the LED driver is 125° C.; the package thermal resistance is 80 K/W. Therefore the designer can allow a maximum of 1 Watt dissipation inside the IC to allow 80° C. rise in internal temperature of the IC. Within these constraints the designer will use the most cost-effective components and design for as high a current as possible. The converter has 1 MHz switching frequency, 10% ripple and 1 A DC current, and the total power dissipation inside IC in this configuration is 33% DC power and 66% switching power. Without any protection, the IC works just within safe limits.

If the ambient temperature increases to 65° C. the internal temperature starts rising and will go to 145° C.; in fact the IC will usually switch off just above 130° C. If the switching frequency could be reduced to half, the AC power would become half, and the total power dissipated in the IC reduces to 66% of its original value. This would have limited the temperature to 122° C. The ripple then becomes 20% and frequency 500 kHz.

To enable this, the internal IC power de-rating should commence once the temperature crosses 115° C. for example (i.e. the $T_{early}$ threshold is set to that temperature); and aiming to reduce switching frequency by half by 125° C. (i.e. $T_{shut}$ is set to that temperature). Thus on a linear scale, from 115° C. to 125° C., the ripple should be increased by 1% per ° C. rise in temperature.

One way that the hysteretic levels controller circuit 42 might implement this functionality is to compare with a reference voltage a voltage from the internal temperature sensing circuit 40 representing temperature. The difference between these two voltages is amplified and added to the average ripple voltage. The exact rate of increase of the ripple is then determined by the amplification factor, and the voltage at which regulation starts (i.e. $T_{early}$) is determined by the reference voltage. The amplification factor (A) in volts per degree Celsius could be determined by the designer of the LED driver as:

$$A = \frac{\%_{max\ ripple}}{\Delta V}$$

where $\%_{maxripple}$ is the desired maximum plus/minus percentage adjustment of the average ripple voltage at $T_{shut}$, and $\Delta V$ is the difference between the voltage received from the internal temperature sensing circuit 40 at $T_{shut}$ and the reference voltage received at $T_{early}$. The hysteretic levels controller 42 may be adjusted by the user to set A for the particular application. A may be hard programmed in the IC, by digital or analogue circuitry, or can be set by the user if necessary by adjusting a resistance connected to an external pin on the DIP, or as input from a micro controller if it is a digital system. In most cases A could be a fixed value in the IC, since the maximum IC temperature is fixed by the technology.

In use, the hysteretic levels controller 42 amplifies the difference between the current temperature and $T_{early}$ by the amplification factor A, adds the result to the average ripple voltage to obtain the new peak voltage level, and subtracts the result from the average ripple voltage to obtain the new valley voltage level. These new levels are input to the MUX 44 whereby power dissipation inside the IC is decreased for temperature increases above $T_{early}$ and is increased for temperature decreases above $T_{early}$.

The hysteretic levels controller circuit 42 permits design of an application circuit employing the LED driver 10 for the typical expected ambient operating temperature, rather than for the highest expected ambient operating temperature. This reduces the cost of the application circuit (since smaller inductances can be used on the power pin for example). At the same time the LED driver circuitry and LEDs are protected by limiting power dissipation when the ambient temperature is high but without compromising the output light quality as perceived by the human eye.

Figure 4:
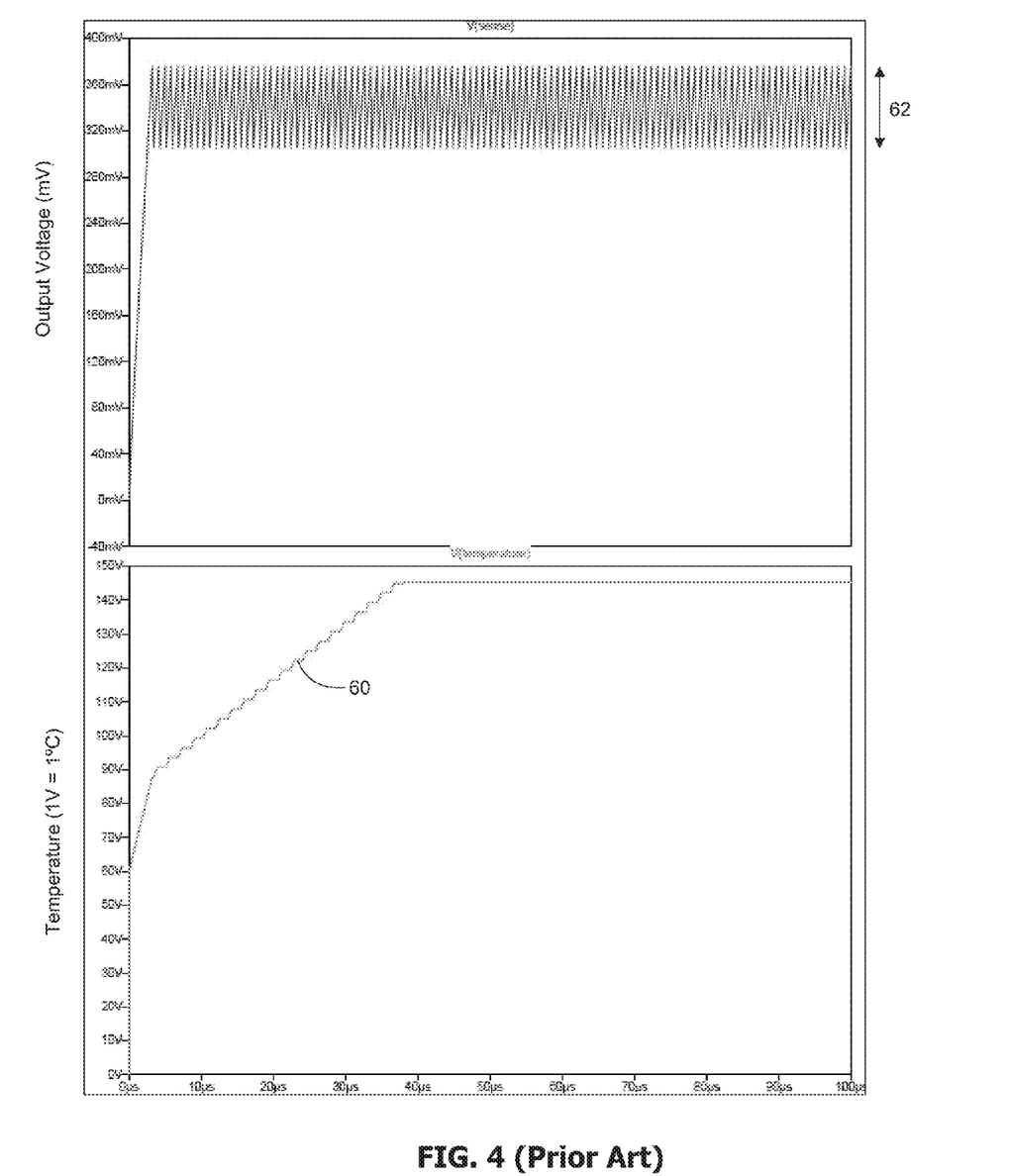
FIG. 4 is a graph showing the ripple voltage and temperature increase of a simulation of an LED driver.
Figure 5:
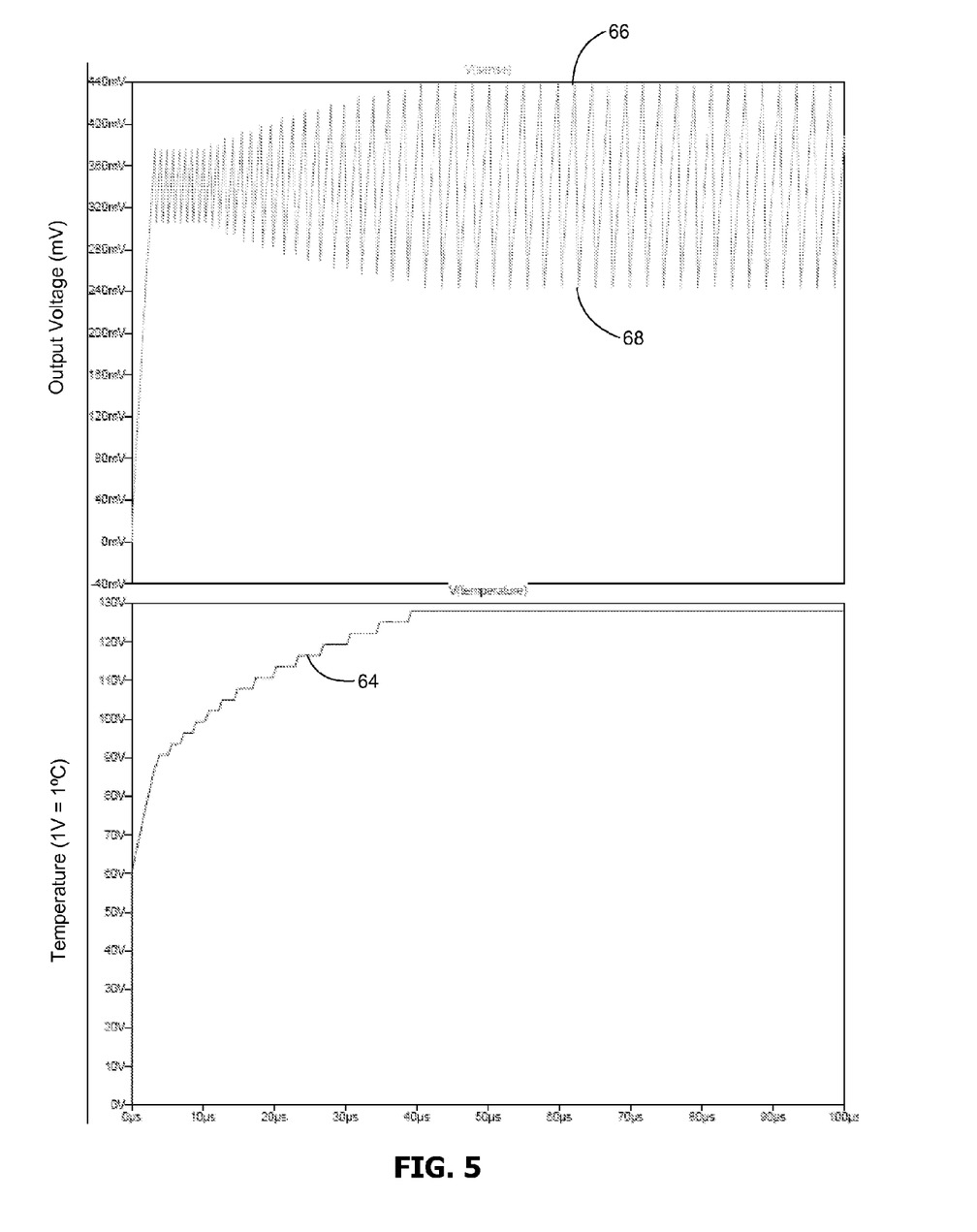
FIG. 5 a graph showing the ripple voltage and temperature increase of a simulation of an LED driver in accordance with the invention.

FIG. 4 shows two graphs illustrating the ripple voltage versus time of a conventional LED driver. As is shown on the lower graph, the temperature 60 in the LED driver (given in terms of a voltage from the voltage sensing circuit 40 with 1V=1° C.) increases over a 35 μs period from 90° C. to 145° C. During that time the ripple voltage 62 does not change, and the same magnitude in heat losses are dissipated in the IC. Eventually the IC will shutdown when $T_{shut}$ is reached, unless some other external environmental factor changes. FIG. 5 shows two graphs illustrating the ripple voltage versus time of an embodiment of LED driver in accordance with the present invention. The lower graph shows that the temperature 64 in the LED driver increases in the early stages (first ~10 μs) in a similar way as in FIG. 4. However, in response to the increasing temperature, the hysteretic levels controller 42 begins to adjust the peak voltage and valley voltage levels 66, 68 to reduce switching frequency and the heat losses in the IC. The temperature graph shows that as a result the rate of change of temperature is reduced, and by about 40 μs has only reached about 125° C. (as compared to about 145° C. in FIG. 4). Thus by controlling the hysteretic levels the internal temperature of the IC has been reduced (in this case by about 20° C.), but without change of the average voltage (and therefore the average current). Thus the performance of the LEDs is not inhibited from the perspective of the human eye, and the chance of thermal shutdown of the LED driver is reduced.

Figure 6:
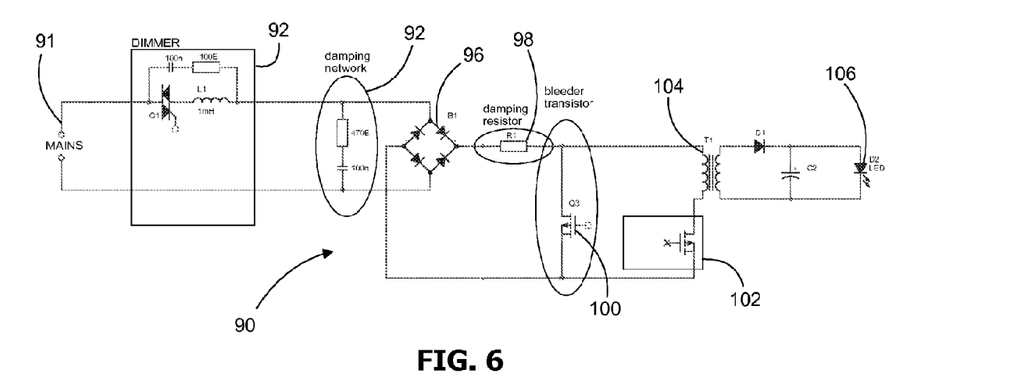
FIG. 6 is schematic block diagram of a second embodiment of an IC according to the present invention in use.
Figure 7:
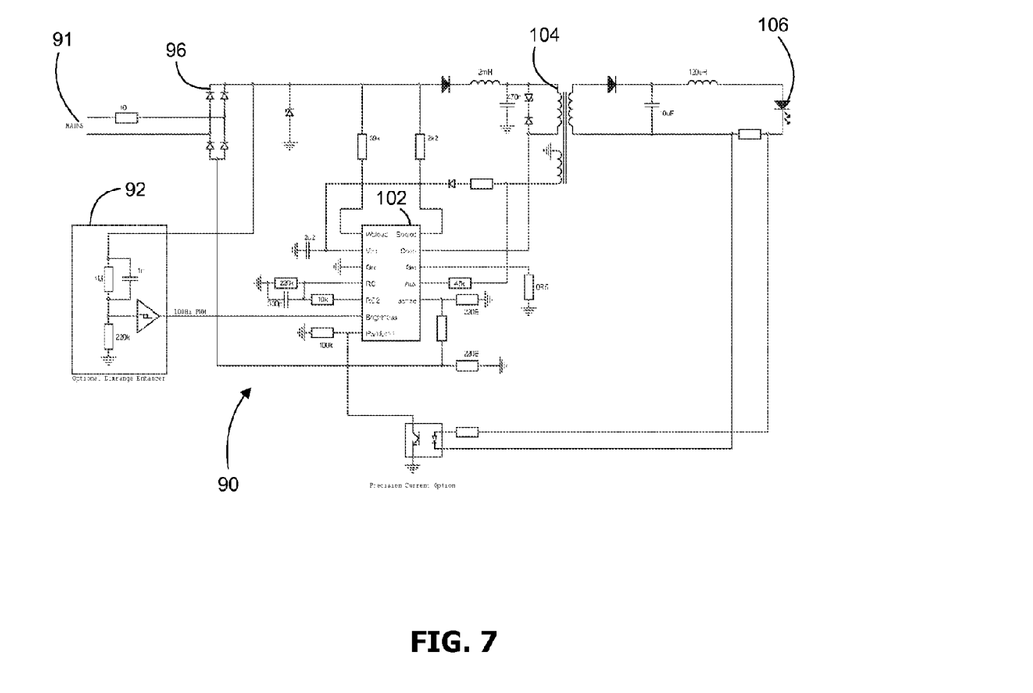
FIG. 7 is a schematic block diagram of a particular application of the IC in FIG. 6.

Referring to FIG. 6 a second embodiment of an LED driver 90 according to the present invention is shown in a flyback converter configuration. Such a flyback converter might be useful LED lighting applications with optional dimming control for example. The LED driver 90 is shown connected to a mains supply 91 and comprises a dimmer circuit 92, a damping network 94, a full-wave rectifier circuit 96, a damping resistor 98, a bleeder transistor 100, a controller IC 102, a transformer 104 and one or more LED(s) 106. FIG. 7 shows a particular application employing the LED driver 90, with like numerals indicating like parts.

In use, rectified AC mains is input voltage to the controller IC 102 which in turn controls the switching of input voltage across the transformer 104. In particular, the controller IC 102 controls the primary side switching by turning on an off an integrated transistor. The LED(s) 106 is connected to the secondary side of the transformer 104, and is therefore isolated from the primary side by a transformer. It is possible to set the IC to use one of a number of different kinds of control schemes to maintain the desired LED current. All schemes should result in discontinuous conduction mode of operation of the converter, since the continuous mode results in instability.

As an example, one control scheme is constant frequency switching with peak current control. This results in a constant LED current, irrespective of the input voltage ($V_{in}$). The peak current is set by comparing the switch current with a reference ($I_{peak}$) and the switching frequency is set by charging a capacitor until the voltage reaches another reference ($V_{capRef}$) triggering discharge of the capacitor and the start of a new cycle. The power dissipation in the controller IC 102 is dependant on the RMS current through the switch and the losses due to the switching on and off. In order to keep the average output substantially constant the RMS current through the switch must not change. Of the two controllable factors, the RMS current through the switch will have some dependency on the value of $I_{peak}$, and the switching losses almost completely depend on switching frequency for a certain $V_{in}$ and switching speed.

As the internal temperature of the controller IC 102 rises above the warning level ($T_{early}$), the controller IC 102 can change the internal power dissipation, without affecting the output current, by adjusting the switching frequency and the value of $I_{peak}$. How the adjustment is performed depends on which power loss is dominant inside the IC:RMS current through the switch or switching losses. If switching losses are dominant, a reduction in switching frequency and an increase in $I_{peak}$ would help to reduce power dissipated. However, if RMS conduction losses are dominant, an increase in switching frequency and a reduction in the value of $I_{peak}$ would help to reduce power dissipated. Which losses are dominant is a decision taken by the IC architect during the design process. The architect will design the IC with a particular ratio of losses in mind; once the dominant loss is determined by the IC architect the circuitry can be designed to adjust the switching frequency and $I_{peak}$ as described above.

Figure 8:
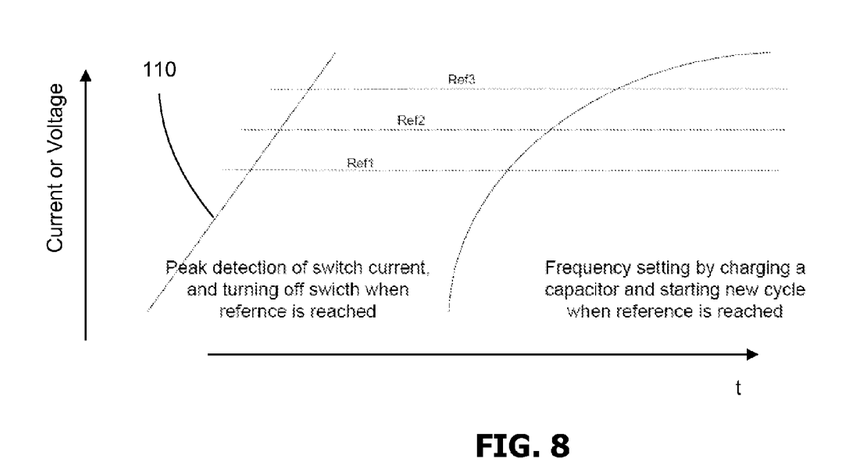
FIGS. 8 and 9 illustrate peak current and switching frequency control used in the ICs of FIGS. 6 and 7.
Figure 9:
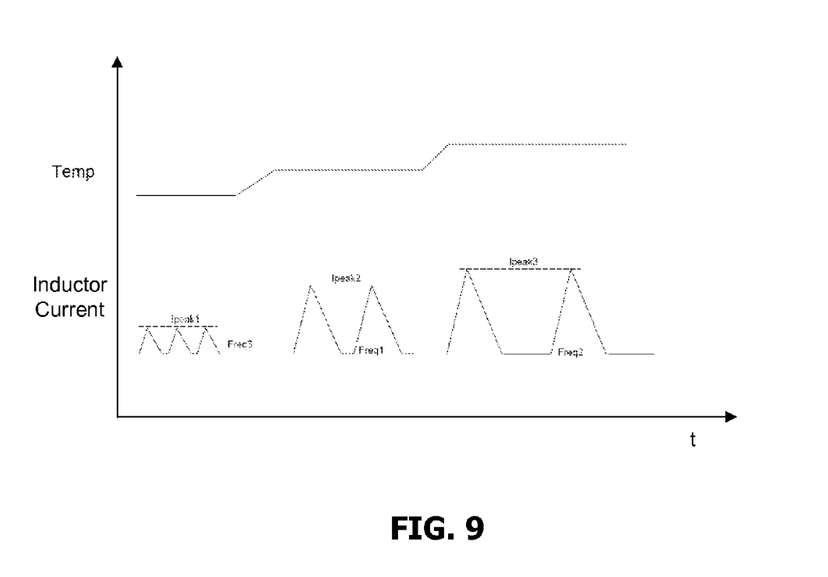

FIG. 8 illustrates this principle. In particular, assuming constant output voltage, output current is proportional to $I_{peak}^2$*switching frequency; therefore derating of $I_{peak}$ and switching frequency can be used to keep the output current constant. In FIG. 8, $I_{peak}$ is adjusted up and down a linear scale 110 depending on whether internal temperature is increasing or decreasing. For example if internal temperature is increasing, $I_{peak}$ may be increased from Ref1 to Ref2. At the same time the switching frequency is changed inverse quadratically with respect to $I_{peak}$. As shown in FIG. 8 in the graph of voltage versus time, an increase of $I_{peak}$ results in a corresponding increase in the voltage ($V_{capRef}$) to which the reference capacitor is charged before a new cycle is started. This takes a longer time and therefore reduces the switching frequency. It will be noted that the switching frequency reduces faster than $I_{peak}$ increases. FIG. 9 shows the result on the output current from the converter as temperature increases with time. With each increase in temperature, $I_{peak}$ is increased and the switching frequency reduced. In this way the average output current can be maintained substantially constant whilst the power dissipated inside the IC is reduced.

Figure 10:
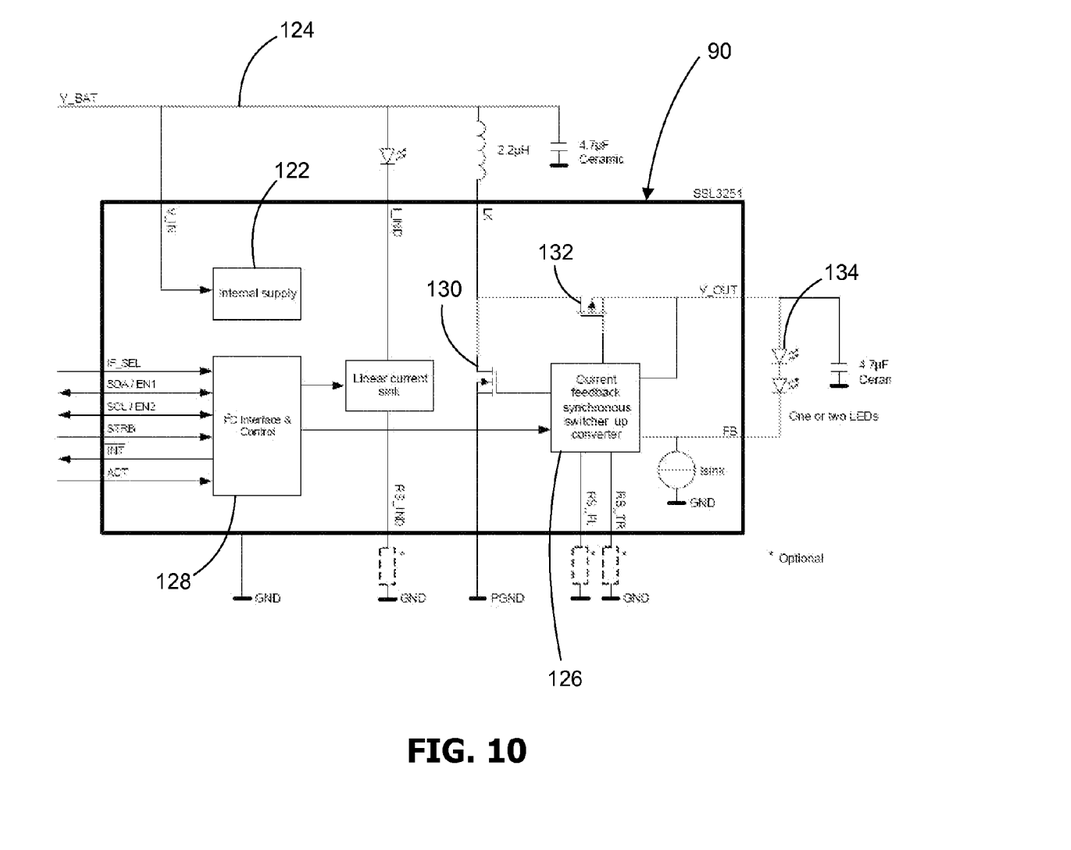
FIG. 10 is schematic block diagram of a third embodiment of an IC according to the present invention in use.
Figure 11:
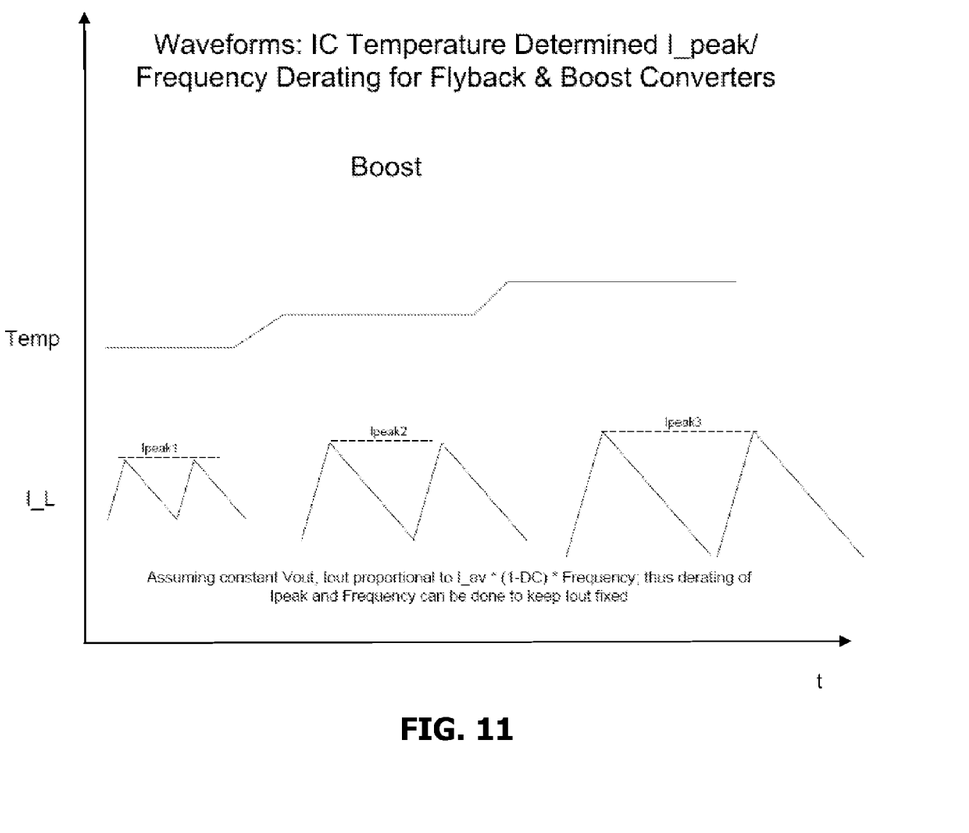
FIG. 11 illustrates peak current and switching frequency control used in the IC of FIG. 10.

Referring to FIG. 10 a third embodiment of an LED driver 120 according to the present invention is shown in a boost converter configuration. Such a boost converter might be useful for LED camera flash applications on mobile telephones for example. The LED driver 120 comprises an internal power supply 122 derived from a battery power supply 124. A switch mode power circuit 126 is controlled by a logic circuit 128 which in the embodiment comprises an I$^2$C interface and control circuit. Two MOSFETs 130, 132 connected to and controlled by the switch mode power circuit 126, in order to apply current through one or two LEDs 134.

The same control concept as described above in connection with the second embodiment can also be applied to the boost converter. The control is again in the constant frequency and peak current mode. In particular assuming constant $V_{out}$, $I_{out}$ is proportional to $I_{av}$*(1–DC)*frequency, where DC is the duty cycle. Therefore de-rating of $I_{peak}$ and switching frequency can be adjusted according to internal temperature to keep output current constant. For this, either analogue circuitry (as above) can be used, or digital logic can be used since the IC process used here allows a large amount of digital control. If necessary, this feature can be integrated into the slope compensation already built in.

In the second and third embodiments, a reduction in internal IC power consumption is achieved by constant $T_{off}$ control in combination with increased peak current control so that the average output current is substantially unaffected. Other control schemes are possible to achieve the same result: for example constant $T_{on}$ control in combination with valley current control. The compensation required by the peak and valley control to maintain constant average output current should be a percentage increase (for peak current) or decrease (for valley current) that is equivalent to half the percentage change of either $T_{off}$ or $T_{on}$. So when $T_{off}$ is increased with temperature and average current falls, the peak current level increased to compensate. Similarly, when $T_{on}$ is increased and average current increases, the valley current level is reduced to compensate. All of these control schemes can be applied to the first embodiment and also any buck, boost or flyback converter when desirable.

Another control scheme that can be used in any of the embodiments described herein, is constant frequency control. In particular, by reducing the switching frequency linearly with temperature above $T_{early}$ the power consumed by the IC can be reduced. The average current will be reduced but this can be compensated by increasing the peak current level be a percentage that is half the percentage decrease in switching frequency.

The above examples show how the inventive concept can be applied to a wide variety of DC-DC converters. Using the IC temperature information to adapt the control parameters (be it frequency, peak current or hysteretic levels, etc.), the internal power dissipation can be reduced with as little visible consequence as possible. Using the invention the IC performance will start falling outside specifications on the least important functional parameters first (like ripple, peak current etc.) before temperature cut-off, which is preferable to a simple cut-off strategy.

In some aspects, the invention involves using temperature information from the on-chip sensor block (which is required for temperature protection, and thus already present) to derate the power of the IC, without observably affecting the LED(s): as the temperature of the chip rises above a preset level, the IC power is reduced by an increasing amount up to an upper level, at which temperature conventional thermal cut-out would be applied. For a hysteretic control scheme, the frequency of operation is reduced by increasing the ripple. The average current, and therefore LED brightness is unaffected. Second, if control is by constant $T_{on}$ or $T_{off}$, the driver phase-control is changed by altering the timing of either the turn-off or turn-on of one of the power transistors. The third is used with constant frequency control schemes, and is to directly reduce the frequency of operation. In the latter two embodiments compensation, to ensure that the average current (and thus the LED brightness) is substantially unaffected, is performed by adjusting the peak current level.

The invention may be embodied as an analogue or digital circuit. Such circuits may be manufactured as a ASICs or ASSPs. Each IC may comprise one or more of the above embodiments. If more than one of the power de-rating methods is embodied on a single IC, this provides the application designer with a choice as to how power is de-rated beyond $T_{early}$. In that case, the selection of which embodiment is used by the IC may be controlled by application of different voltage levels on external pin(s) for example.

The invention may also be embodied in a microcontroller, or other IC with integrated logic. For example, where a microcontroller controls an LED driver IC, the microcontroller may control de-rating of the power as selected by the designer. The microcontroller will require an input of the temperature as measured by the internal temperature sensing circuit in the LED driver, and therefore the LED driver may require modification to provide the temperature output signal to an external pin so that it may be fed to the microcontroller.

The invention claimed is:

1. A DC-DC converter for driving one or more LED, which converter comprises an integrated circuit having a switch mode power circuit and a temperature sensing circuit for providing an output indicating a temperature of said integrated circuit, the arrangement being such that, in use, said integrated circuit consumes power, some of which power is dissipated in said integrated circuit as heat causing a rise in said internal temperature, and wherein a change in said output from said temperature sensing circuit is used by said integrated circuit to adjust said consumed power whereby said internal temperature may be controlled; and
   wherein integrated circuit is configured to compare said output from said internal temperature sensing circuit with a first temperature level and a second temperature level higher than said first, and if said internal temperature is higher than said first temperature level and lower than said second, to adjust said consumed power in proportion to the difference between said output and said first temperature level.

2. A DC-DC converter as claimed in claim 1, wherein said switch-mode power circuit is for supplying a substantially constant average current to said one or more LED, wherein said converter comprises a circuit for controlling said switch-mode power circuit so as to adjust said consumed power whilst leaving said average current substantially unaffected, whereby the visual appearance of said one or more LED appears unaffected.

3. A DC-DC converter as claimed in claim 1, wherein said integrated circuit is configured to effect a substantially linear increase in said ripple voltage of said switch-mode power circuit as said internal temperature increases from said first to said second temperature level.

4. A DC-DC converter as claimed in claim 1, further comprising a hysteretic levels controller circuit for setting at least one of a peak voltage level and a valley voltage level, which peak and valley levels determine said ripple voltage of said switch-mode power circuit.

5. A DC-DC converter as claimed in claim 4, wherein said internal temperature sensing circuit is adapted to supply said output to said hysteretic levels controller circuit that is configured to increase the magnitude of a ripple voltage of said switch-mode power circuit whereby the switching frequency is reduced.

6. A DC-DC converter as claimed in claim 5, wherein said hysteretic levels controller circuit is configured to raise said peak voltage level and lower said valley voltage level in response to increasing internal temperature, thereby reducing said switching frequency to effect de-rating of said consumed power.

7. A DC-DC converter as claimed in claim 6, wherein said hysteretic levels controller circuit is configured to raise said peak and lower said valley voltage levels by the same amount, whereby said average current is unaffected by de-rating of said consumed power.

8. A DC-DC converter as claimed in claim 1, further comprising a control logic circuit for adjusting the average current output by said converter by controlling an on period and an off period of each commutation cycle of said switch-mode power circuit.

9. A DC-DC converter as claimed in claim 8, wherein said control logic circuit is configured to increase said off period to de-rate said consumed power in response to an increase in said internal temperature as indicated by said output.

10. A DC-DC converter as claimed in claim 9, wherein said control logic circuit is configured to control said on period by adjusting a peak current level in said switch-mode power circuit in order to compensate for a decrease in said average current output by said converter.

11. A DC-DC converter as claimed in claim 8, wherein said control logic circuit is configured to increase said on period ($T_{on}$) to de-rate said consumed power in response to an increase in said internal temperature as indicated by said output.

12. A DC-DC converter as claimed in claim 11, wherein said control logic circuit is configured to control said off period by adjusting a valley current level in said switch-mode power circuit in order to compensate for an increase in said average current output by said converter.

13. A DC-DC converter as claimed in claim 1, wherein said integrated circuit is configured to reduce the switching frequency of said switch-mode power circuit in response to an increase of said internal temperature as indicated by said output.

14. A DC-DC converter as claimed in claim 13, wherein said integrated circuit is configured to increase a peak current level in said switch-mode power circuit in order to compensate for a decrease in said average current output by said converter.

15. An ASIC or ASSP comprising a DC-DC converter as as claimed in claim 1.

* * * * *